Feb. 4, 1969  H. H. HOLDEN  3,425,913
APPARATUS FOR REMOVING PARAFFIN FROM CRUDE OIL
Filed Oct. 12, 1966
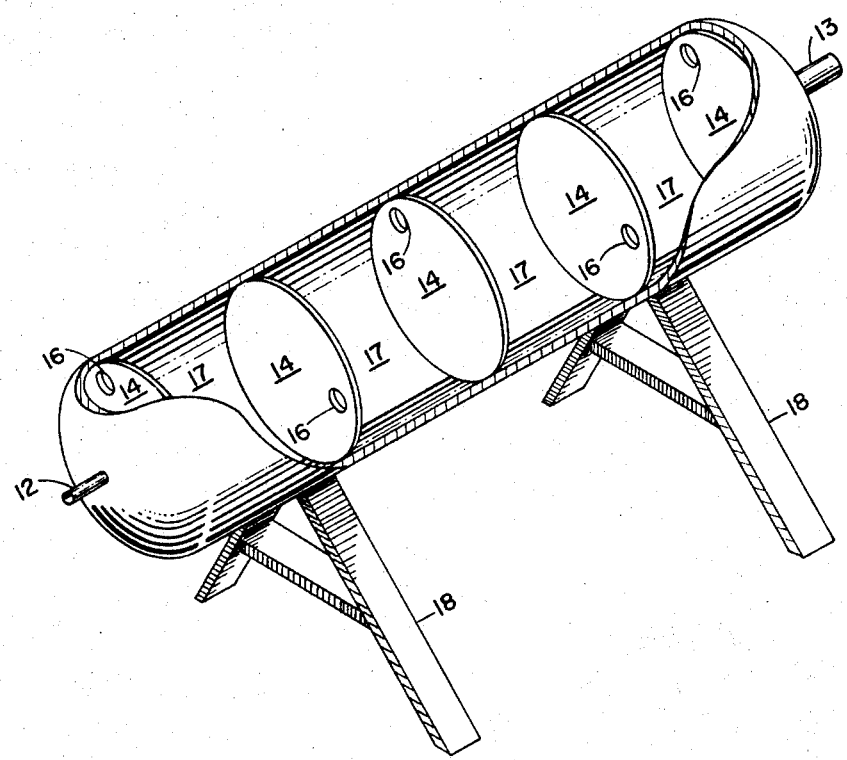
INVENTOR
HAROLD H. HOLDEN
BY
ATTORNEY ed through outlet 13. As the crude passes through the accumulator, paraffin drops out of solution and accumulates in the bottom of tank 11 with relatively little being entrained by the crude flowing through the aperture 16. As a result, such paraffin tends to accumulate in the spaces between adjacent baffles 14 within tank 11 until substantially all of the volume not required for the flow of crude through the tank is filled with accumulated paraffin.

United States Patent Office

3,425,913
Patented Feb. 4, 1969

3,425,913
APPARATUS FOR REMOVING PARAFFIN FROM CRUDE OIL

Harold H. Holden, Borger, Tex., assignor to Continental Oil Company, Ponca City, Okla., a corporation of Delaware
Filed Oct. 12, 1966, Ser. No. 586,220
U.S. Cl. 196—14.5                    3 Claims
Int. Cl. C10g 43/04

ABSTRACT OF THE DISCLOSURE

An apparatus for removing paraffin from crude oil comprising an elongated substantially horizontal tank having an inlet at one end and outlet at the opposite end, the tank containing a plurality of substantially vertically disposed horizontally spaced apertured baffle discs forming a series of sealed chambers except for the apertures in the baffle discs. When paraffin-laden crude oil is flowed through the tank, the paraffin drops out and accumulates in the series of chambers and tank side walls.

---

This invention relates to a paraffin accumulator and, more particularly, relates to an accumulator for removing heavy hydrocarbons from crude oil.

In some areas of the world it is not uncommon for naturally occurring crude oil to contain substantial amounts of heavier hydrocarbons which are referred to collectively as paraffin. Because of the limited solubility of such paraffins within the crude, they tend to come out of solution when the pressure and temperature at which the crude naturally exists are lowered. As a result, it is not uncommon for paraffin to accumulate in lines leading from the wellhead to a tank battery which become restricted and ultimately blocked if remedial action is not taken.

A number of approaches have been suggested and practiced for the problem of paraffin accumulation. For instance, it is not uncommon for certain chemicals to be used either to coat the wall of the flow line to prevent sticking of the paraffin, or to keep the paraffin in solution in the crude. Unfortunately, however, no chemical agents have been found which have been completely satisfactory for this purpose. Moreover, the price of some of these materials is such as to render their commercial utility impractical. It has also been suggested to remove the accumulated paraffin at selected time intervals by pumping hot oil in the flow line to melt the paraffin and remove it. Unfortunately, however, while this method is reasonably satisfactory, it is expensive and also prevents utilization of the equipment during the hot oil treatment. Because of these and similar limitations in prior art paraffin control methods, apparatus which is sufficiently inexpensive as to be commercially feasible, relatively foolproof in operation and which has a relatively long and trouble-free service interval between periods of downtime has remained an elusive desideratum.

It is, therefore, an object of the present invention to provide a new and improved paraffin accumulator.

Another object of the present invention is to provide an improved accumulator for removing heavier hydrocarbons from crude oil.

Yet another object of the present invention is to provide apparatus for removing paraffin from crude oil without restricting flow lines carrying such crude oil.

Still another object of the present invention is to provide mechanical equipment for removing and accumulating paraffin over long periods of time without service.

An additional object of the present invention is to provide mechanical apparatus which is simple and inexpensive to construct and easy to maintain for removing paraffin from crude oil.

These and other objects may be achieved with apparatus embodying the present invention which, in one form, comprises an elongated, substantially horizontal tank which has an inlet and an outlet. A plurality of baffles may be provided at spaced intervals within the tank, with each of the baffles having formed therein an aperture which is offset in relation to the apertures in adjacent baffles. The baffles are of such number and the apertures are of such size as to create a pressure drop of at least 50 p.s.i. between the inlet and the outlet of said tank during the flow of crude therethrough.

A more complete understanding of the present invention may be obtained from a perusal of the following detailed written description when read in conjunction with the accompanying drawing which discloses an isometric view of one form of structure embodying the invention with a portion of said structure being cut away to reveal internal elements.

Turning now to the drawing, there is shown a closed, elongated, cylindrical tank 11 which is situated in a substantially horizontal position. Communicating with the interior of the tank is a fluid inlet 12 at one end and a fluid outlet 13 located on the opposite end of tank 11. A plurality of circular baffles 14 are mounted within tank 11, with the plane of the baffles being substantially normal to the longitudinal axis of the tank. Due to the presence of these baffles, a series of chambers 17 of approximately equal size are formed within the tank. Communication between adjacent chambers 17 is obtained through apertures 16 which are formed in the baffles.

In order to increase the head loss across the tank, apertures 16 are offset in relation to adjacent apertures; and, in the embodiment shown, such offset is in a repeating pattern on alternate sides of the vertical axes of baffles 14. Inasmuch as it is the primary object of the present invention to remove paraffin from solution primarily by means of pressure drop, it is necessary that the number of baffles and the size of the apertures within the baffles be such as to create a head drop of at least 50 p.s.i. between inlet 12 and outlet 13. Such head drop is, of course, dependent upon several factors: such as, flow velocity and viscosity of the crude, which are not directly related to the structure of the accumulator; thus, to some extent, the number of baffles and size of the apertures depend upon the conditions encountered in the field. By way of example, but not by way of limitation, it has been found, for instance, that when a crude containing 2 percent paraffin and having a viscosity of 39 centipoises is to be passed at 4 gallons per minute through a paraffin accumulator such as shown in the drawing, a minimum of 5 baffles is necessary in a tank having a diameter of 24 inches, and it is also necessary that the aperture in each baffle be not larger than about ¼ inch. In general it has been found that for average field conditions a tank having an inside diameter from about 24 inches to about 29 inches with from about 4 to about 5 baffles in which are formed apertures of from about ¼ inch to about ½ inch diameter will be satisfactory. In any event, routine fluid mechanics may be applied to determine the optimum number of baffles and size of apertures for a given set of field conditions.

It is desirable that conditions be optimized for heat leak from the system and thus it has proved advantageous to elevate the structure by means, such as legs 18, to allow free circulation of air around tank 11. If desired, it is, of course, possible that heat exchange fins could be mounted on the exterior of the tank but this is an embellishment which has not been found necessary in practical application of the apparatus.

In using the apparatus, crude containing paraffin is introduced into tank 11 through inlet 12 and removed there-from through outlet 13. As the crude passes through tank 11, it follows a tortuous course due to the presence of the offset apertures in the baffles. Simultaneously, because of the construction brought about by the relatively small apertures, energy is dissipated in forcing the crude through the apertures with the resultant cumulative head loss between inlet 12 and outlet 13. In response to the combined pressure drop and cooling experienced by the crude in its passage through tank 11, paraffins come out of solution and drop into the bottom of each of the chambers 17. Due to the fact that tank 11 is substantially larger than the flow line, this accumulation of paraffins can be continued much longer than paraffin accumulation could be tolerated in a standard flow line. It will, of course, be more desirable to locate apertures 16 in the upper quarter of the baffles so as to maximize the portion of the tank which can be used for paraffin accumulation.

Ultimately, the chambers 17 will fill with paraffin to a level even with apertures 16. When this occurs, it is necessary to remove the paraffins and this may be accomplished by circulating heated oil through the tank to liquefy and remove the entrapped solids.

Other forms of the apparatus of this invention will be apparent to those skilled in the art without necessitating the exercise of the inventive faculty. It will be understood that various changes in the details and arrangements of parts, which have been herein described and illustrated in order to explain the nature of the invention, may be made by those skilled in the art within the principle and scope of the invention.

What is claimed is:
1. Apparatus for removing paraffin from crude oil comprising:
   (a) an elongated, substantially horizontal tank having an inlet at one end and an outlet at the opposite end; and
   (b) means for feeding crude oil at the inlet end of the tank, a plurality of vertically disposed baffle discs which are horizontally spaced along the longitudinal axis of the tank providing a series of sealed chambers between the discs, each of said discs being provided with a single orifice alternately disposed in the successive discs;
   (c) the number of baffles and size of apertures being such that the pressure of the crude oil passing through said inlet is higher than the pressure of the crude passing through said outlet.

2. The apparatus defined in claim 1 further characterized by means for supporting said tank above the ground whereby air can freely move around the surface of said tank.

3. The apparatus defined in claim 1 wherein there are 5 baffles and wherein said apertures are not larger than about ¼-inch in diameter.

References Cited

UNITED STATES PATENTS

| | | | |
|---|---|---|---|
| 2,302,434 | 11/1942 | Dons et al. | 208—30 X |
| 2,354,246 | 7/1944 | Dons et al. | 23—270 X |
| 2,370,453 | 2/1945 | Dons et al. | 208—31 |
| 3,192,125 | 6/1965 | Sparks et al. | 23—270 X |
| 660,251 | 10/1900 | Gray | 196—14.5 X |
| 1,680,641 | 8/1928 | Salerni | 165—94 X |
| 2,677,394 | 5/1954 | Brinen et al. | |
| 2,361,503 | 10/1944 | Schutte et al. | 196—14.5 X |
| 2,420,418 | 5/1947 | Dons et al. | 196—14.5 |
| 2,717,049 | 9/1955 | Langford. | |
| 2,914,456 | 11/1959 | Moore et al. | 196—14.5 |
| 3,159,563 | 12/1964 | Anastasoff et al. | 196—14.5 X |

FOREIGN PATENTS

| | | |
|---|---|---|
| 11,127 | 7/1915 | Great Britain. |
| 456,680 | 3/1946 | Canada. |

NORMAN YUDKOFF, *Primary Examiner.*

F. E. DRUMMOND, *Assistant Examiner.*

U.S. Cl. X.R.

23—270; 165—109; 208—28; 210—521